Nov. 2, 1965 J. J. EACHUS 3,215,822
ELECTRICAL DIGITAL DATA MANIPULATING APPARATUS
Filed July 30, 1962 2 Sheets-Sheet 1

INVENTOR.
JOSEPH J. EACHUS
BY Henry L. Hanson
ATTORNEY

United States Patent Office 3,215,822
Patented Nov. 2, 1965

3,215,822

ELECTRICAL DIGITAL DATA MANIPULATING APPARATUS

Joseph J. Eachus, Cambridge, Mass., assignor to Honeywell Inc., a corporation of Delaware Filed July 30, 1962, Ser. No. 213,258
8 Claims. (Cl. 235—175)

Figure 1:
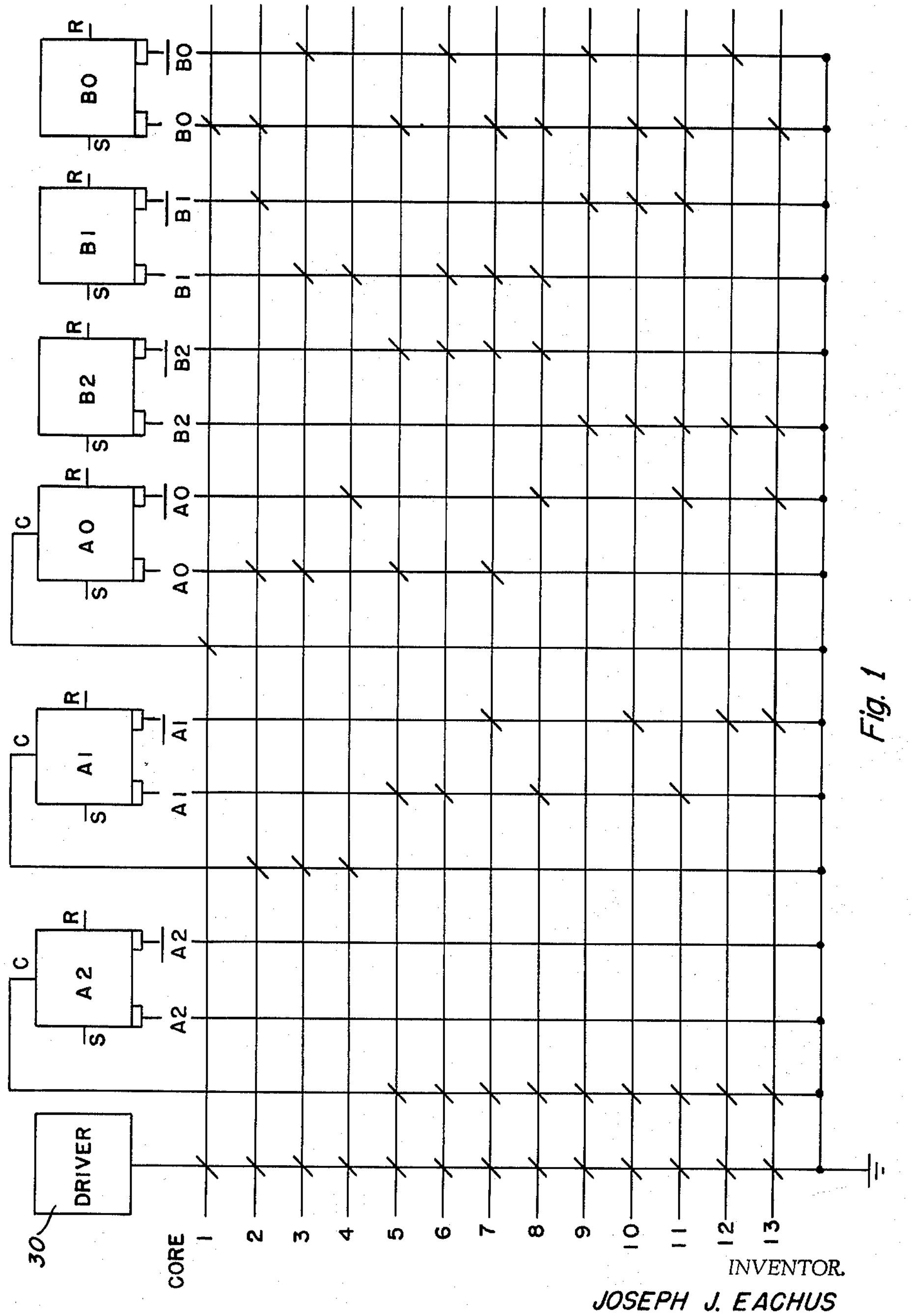

A general object of the present invention is to provide a new and useful electrical apparatus which may be used for manipulating digital data to carry out certain arithmetic operations. More specifically, the present invention is concerned with a new and improved type of electronic circuitry which may be used for performing certain arithmetic operations such as adding, subtracting, and accumulating, which circuitry is characterized by the simplicity with which the logic may be implemented and wherein the resultant circuitry is extremely reliable and economical to fabricate.

Electronic data processing apparatus is widely used for purposes of manipulating digital data. One of the functions most widely implemented in such data processing apparatus is the function of adding or accumulating digital data. The digital data in most such data processing apparatus is generally manifested by way of electrical pulse signals, or a predetermined combination of signal levels, which may uniquely define binary "ones" and "zeros," arranged in a predetermined combinatorial code. An element that has been found to be useful for purposes of handling digital data signals is the saturable magnetic core used in combination with other electrical circuitry.

One way of using saturable magnetic cores for handling data is to use the cores as the basis for implementing various types of logical circuits. Thus, a saturable core element may be used for selectively gating or passing an electrical signal in accordance with whether the core is in a saturated or non-saturated state. It has been found, in accordance with the teachings of the present invention, that the logical gating functions that may be implemented using these saturable magnetic cores may be uniquely combined with bistable control circuits for forming circuits that may be used to perform certain arithmetic functions.

It is therefore a further more specific object of the present invention to provide a new and improved data processing circuit incorporating saturable magnetic cores as logical elements for purposes of implementing arithmetic functions.

In a preferred embodiment of the present invention, the arithmetic function is implemented using a pair of input operand registers formed of bistable electronic elements which are uniquely and selectively coupled to a plurality of saturable magnetic cores so that selected ones of the cores will be saturated when a predetermined combination of input data lists exist in the input registers. The foregoing also includes a further unique relationship between sense winding means coupled to the cores and to complementing input means associated with one of the operand registers. With this unique arrangement of elements, the application of the input operands to the input registers will result in the sum being accumulated in one of the input registers.

Another object of the invention is therefore to provide a new and improved arithmetic type of circuit employing a plurality of saturable magnetic cores operating in conjunction with a pair of input operand registers formed of a plurality of bistable circuits with a feedback from the magnetic cores being applied to one of the registers for purposes of selectively complementing one of the registers in accordance with the arithmetic function being performed.

As the number of saturable magnetic cores for implementing a particular arithmetic function may become quite large and unmanageable, in accordance with a further teaching of the present invention means have been provided for dividing the arithmetic function into steps so as to minimize the complexity of the associated logical circuitry.

It is therefore still another object of the present invention to provide a new and improved apparatus in accordance with the foregoing objects wherein further means are provided for minimizing the logical circuitry required by dividing the functions to be performed into a series of steps.

The foregoing objects and features of novelty which characterize the invention, as well as other objects of the invention, are pointed out with particularity in the claims annexed to and forming a part of the present specification. For a better understanding of the invention, its advantages and specific objects attained with its use, reference should be had to the accompanying drawings and descriptive matter in which there is illustrated and described a preferred embodiment of the invention.

Figure 2:
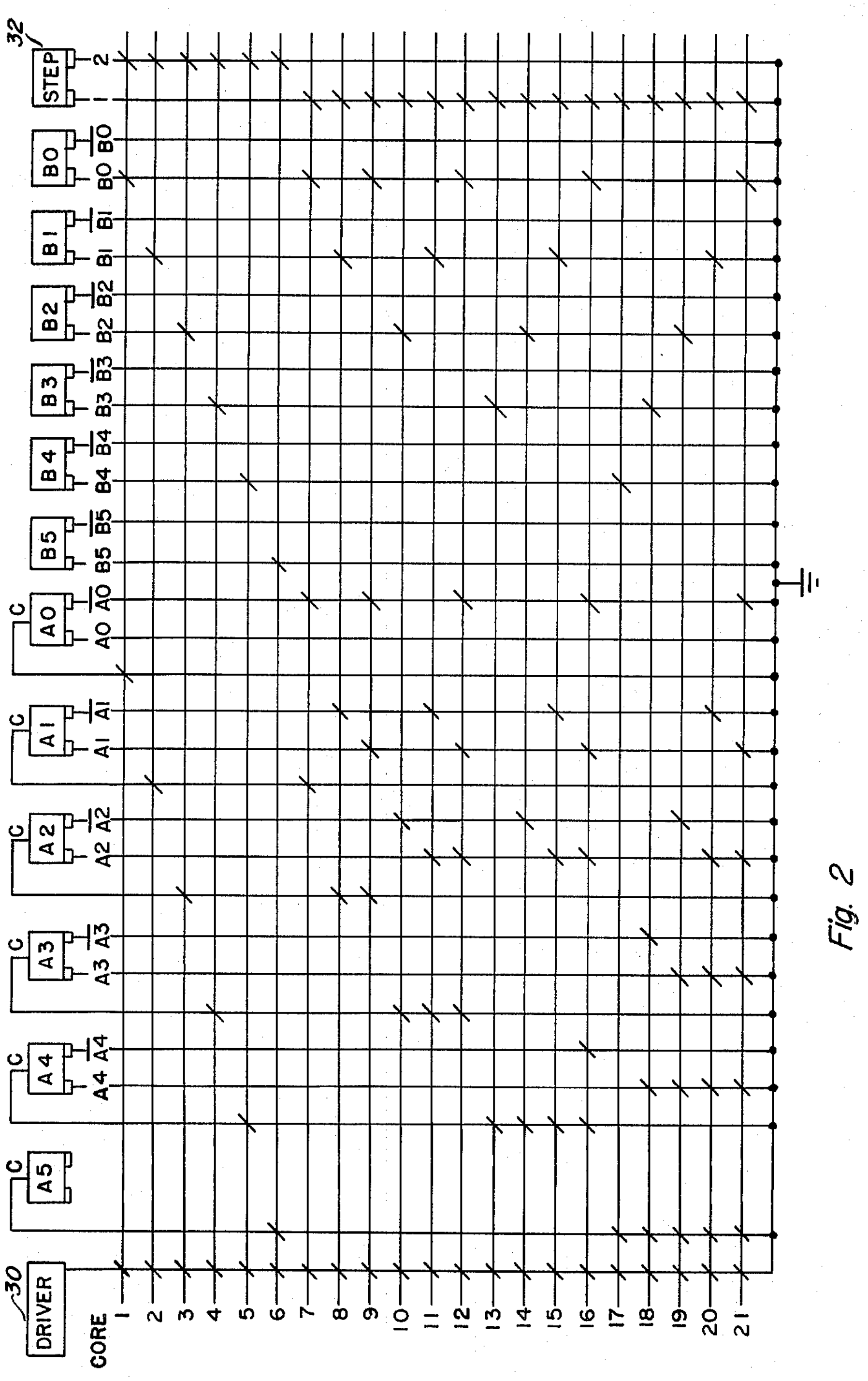

Of the drawings:

FIGURE 1 is a diagrammatic showing of a basic form of the present invention; and FIGURE 2 is a diagrammatic showing of a modification of the invention wherein multiple steps are used in performing the implemented function.

Referring first to FIGURE 1, there is here illustrated a single-step adder which is capable of producing the sum of the two input operands applied to a pair of input registers of the circuit. As illustrated, the input registers comprise an A register having three register circuits A0, A1 and A2. The further operand register is the B register having three register circuits B0, B1 and B2. The outputs of the register circuits are arranged to selectively thread, or be coupled to, a plurality of saturable magnetic core devices numbered 1 through 13. A driver circuit 30 is also coupled to the core devices for switching any core device not saturated to produce a signal in any sense winding coupled thereto. Thus, once the input operands have been fed to the input registers A and B, the operation of the driver circuit will be effective to cause the sum of the input operand to appear in register A by way of feedback to the A register.

Considering FIGURE 1 more specifically, each of the register circuits is shown to comprise a bistable flip-flop which is adapted to provide a pair of current sources, one or the other of which is adapted to be active in accordance with the set or reset condition of the associated bistable circuit. The current outputs from these bistable circuits are assumed to be of sufficient amplitude, when active, to saturate any magnetic core that is coupled thereto. The loading of input data or operands into the registers may be by way of any suitable means which will activate the set and reset inputs to switch the associated bistable circuit to the desired bistable condition to define the input operand. The bistable circuits of the A register, in addition to having the set and reset inputs on each circuit, also have a complementing input C. The presence of a signal on the complementing input will cause the bistable state of the associated register circuit to reverse to a bistable condition opposite that immediately prior to the receipt of a complementing signal.

The driver 30 may be considered to be a switching circuit capable of switching any of the magnetic cores to which it is coupled so long as any such cores do not have a saturating current passing therethrough from some other current source. As the saturable core devices used in the present arrangement are preferably of the rectangular hysteresis type, it is necessary that the signal from the drive source 30 serve to switch the core from one bistable state into the other and then back again by way of what may be termed a drive and redrive pulse signal.

As will be seen in FIGURE 1, the outputs of the bistable circuits of the A and B operand registers are arranged to be passed along the cores 1 through 13. The outputs are arranged to be selectively coupled to the cores for saturating purposes and the points of coupling are identified by a diagonal line which intersects the output line and the core. The sense windings associated with the cores are shown in a similar manner and these sense windings are coupled to the complementing inputs of the bistable circuits of the A register.

The actual wiring of the cores with respect to the outputs of the operand registers and the sense windings may be accurately expressed by way of a series of Boolean statements which are as follows:

TABLE 1

$$DA0=B0$$

$$DA1=A0\ \overline{B1}\ B0+A0\ B1\ \overline{B0}+\overline{A0}\ B1$$

$$\begin{aligned}DA2=&A1\ A0\ \overline{B2}\ B0+A1\ \overline{B2}\ B1\ \overline{B0}\\&+\overline{A1}\ A0\ \overline{B2}\ B1\ B0+A1\ \overline{A0}\ \overline{B2}\ B1\ B0\\&+B2\ \overline{B1}\ \overline{B0}+\overline{A1}\ B2\ \overline{B1}\ B0+A1\ \overline{A0}\ B2\ \overline{B1}\ B0\\&+\overline{A1}\ B2\ B1\ \overline{B0}+\overline{A1}\ \overline{A0}\ B2\ B1\ B0\end{aligned}$$

In the foregoing Boolean statements, each of the terms DA0, DA1 and DA2 represents a condition that will exist when an equality is established on the irght-hand portion of the equation in any one of the terms included therein and this condition will be electrically represented by the register circuit changing its bistable state, or being complemented, upon the occurrence of ths equality condition. Thus, noting the first statement, the register circuit A0 will be complemented if the signal line B0 is in the permit state so that a drive signal may be coupled through one of the cores to the sense winding which leads to the complementing input of the A0 register circuit. In FIGURE 1, it will be noted that the signal line B0 is coupled to core 1 and that the sense line on core 1 leads to the complementing input on the register A0. Thus, if the signal B0 is inactive, or in the permit state, the core 1 will be switched when the drive signal appears from the driver 30 and the resultant drive signal will be coupled to the complementing input of the register circuit A0 so that its bistable state will be reversed.

In a similar manner, it will be seen that the register circuit A1 will be complemented when either of two conditions are met. The first condition which will complement the register circuit A1 is when the signal lines A0, $\overline{\mathbf{B1}}$ and B0 are in the permit state, or second, when the signal lines A0, B1 and $\overline{\mathbf{B0}}$ are in the permit state or third, when the signal lines $\overline{\mathbf{A0}}$ and B1 are in the permit state. The three conditions have been wired into the cores 2, 3 and 4 shown in FIGURE 1.

An examination of the signals controlling the complementing of register circuit A2 will indicate that a total of nine different statements are involved and consequently nine magnetic cores are used for implementing each of the individual combinations of signals required for the complementing function. An examination of FIGURE 1 with respect to cores 5 through 13 will indicate that the statements set forth above are implemented by the appropriate coupling of the output wires of the individual bistable register circuits to the cores.

For purposes of considering a specific operating example of the circuitry shown in FIGURE 1, it is assumed that no information has been fed into the A operand register, so that each of these registers is set to the 0 state. By definition with the apparatus illustrated, the 0 state will be that state wherein each of the circuits A0, A1 and A2 has been set. When set, the negation outputs of each of these register circuits may be considered to be in a permit state insofar as the output not being sufficient to saturate any of the cores coupled thereto. It is further assumed that "ones" have been loaded into the B operand register so that each of the register circuits B0, B1 and B2 is in the reset state. Thus, the outputs B0, B1 and B2 from the register circuits will each be in the permit state insofar as any core that is coupled thereto is concerned.

Upon the application of a drive signal with the aforeassumed conditions existing in the A and B operand registers, three cores in the circuit will be switched by the drive signal and these three cores will be the cores 1, 4 and 13, as will be apparent from a consideration of the Boolean statements set forth above in Table 1. Since these three cores will not be saturated, the drive signal will be coupled through the core into the sense windings coupled thereto so that each of the A operand circuits will have a complementing signal applied thereto by way of its respective input C. Thus, the series of "ones" in the B operand register will have been added to the series of "zeros" in the A operand register with the result being stored in the A operand register as indicated by each of these stages now all having been switched to the reset state by the complementing action.

A further example of how the present apparatus operates will be understood by assuming that a binary coded 3 has been inserted into the A operand register and that a binary coded 1 has been inserted into the B operand register. Under this assumed set of conditions, the register circuits A0 and A1 will be in the reset state, while the register circuit A2 will be in the set state. The register circuit B0 will be in the reset state, while the register circuits B1 and B2 will both be in the set state. This means that the output signal lines A0, A1, $\overline{\mathbf{A2}}$, B0, $\overline{\mathbf{B1}}$ and $\overline{\mathbf{B2}}$ will be in the permit state. By examining the connections of the output lines of the register circuits to the cores of FIGURE 1, it will be apparent that each of cores 1, 2 and 5 will be in the non-saturated state so that upon the application of a drive signal, a signal will be coupled to the complementing inputs of each of the stages A0, A1 and A2. This will result in the changing of the status of the A operand register to a value which represents binary coded 4, or the sum of the input operands assumed above.

As will be apparent from the above Table 1, the addition of a larger number of input register circuits will require an extremely large number of magnetic cores for purposes of implementing the coupling logic. One way of minimizing such an increase, when it is desired to add a larger number of bits of information, is to divide the adding operation into two separate steps. Thus, during the first step, certain preliminary operations are performed in accordance with the input data operands and then, during the second step, the completion of the adding operation is carried out in accordance with the results generated during the first step. Such a two-step adder will be found in FIGURE 2.

Considering FIGURE 2 more specifically, two input operand registers A and B are shown and these operand registers have six register circuits each identified as A0 through A5 and B0 through B5. These individual register circuits may be of the type referred to above in FIGURE 1 and they may provide facilities for energizing one or the other of the pair of outputs associated therewith in accordance with whether a binary "one" or a binary "zero" is stored in the register circuit. Also included in the circuitry of FIGURE 2 is a driver circuit 30 which may be of the type described above in connection with FIGURE 1. A further addition to the circuitry of FIGURE 2 is a step controller 32. This step controller may take the form of a flip-flop having appropriate set and reset means controlled by timing means, not shown.

The circuitry of FIGURE 2 also comprises a total of twenty-one saturable magnetic cores for implementing the logic of the adding operations to be performed. These cores, as in the case of FIGURE 1, are arranged to be selectively coupled to the output lines of the register circuits of the input operand registers A and B. In addition, the driver 30 is arranged to be coupled to all of the cores and the step controller 32 is arranged so that a first series of cores will be permitted to switch at the start of the adding operation and then a second series of cores will be permitted to switch for performing a second step of the adding operation.

The Boolean statements in the following Table 2 represent a wiring logic associated with each of the functions to be performed in effecting the adding operation.

TABLE 2

*Step 1*

$$DA0=B0$$
$$DA1=B1$$
$$DA2=B2$$
$$DA3=B3$$
$$DA4=B4$$
$$DA5=B5$$

*Step 2*

$$DA1=\overline{A0}\,B0$$
$$DA2=\overline{A1}\,B1+A1\,\overline{A0}\,B0$$
$$DA3=\overline{A2}\,B2+A2\,\overline{A1}\,B1+A2\,A1\,\overline{A0}\,B0$$
$$DA4=\overline{A3}\,B3+A3\,\overline{A2}\,B2+A3\,A2\,\overline{A1}\,B1+A3\,A2\,A1\,\overline{A0}\,B0$$
$$DA5=\overline{A4}\,B4+A4\,\overline{A3}\,B3+A4\,A3\,\overline{A2}\,B2\;A4\,A3\,A2\,\overline{A1}\,B1+A4\,A3\,A2\,A1\,\overline{A0}\,B0$$

The statements for Step 1 involve a total of six magnetic cores and these cores are numbered in FIGURE 2 as cores 1 through 6. It will be noted that the step controller 32 is arranged so that if the controller 32 has been switched into the set state, the output line therefore will be in the permit state, insofar as cores 1 through 6 are concerned. Thus, upon the appearance of a drive signal from the driver 30, there will be a complementing of the A Register Circuits which have an input sense winding coupled to any one of the cores which has been switched by the drive signal.

As soon as the first step has been completed, the step controller 32 will be reversed in its bistable state so that now the reset output will be in the permit state with respect to cores 7 through 21. During the second step, the bistable states of the circuit registers in the B operand register will be operative with the outputs of the A operand register circuits, as complemented in the first step. Following the drive signal from the driver 30, the sum will be stored in the A operand register. A detailed operation with respect to any particular combination of lists in an adding operation may readily be determined in the manner described above in connection with FIGURE 1, with the input operand as being appropriately related to the statements set forth for Steps 1 and 2 in the above Table 2.

The number of cores required for implementing the logic in accordance with the principles set forth in FIGURE 2 may be determined by the formula which is as follows:

Total number of cores equals $\frac{1}{2}n(n+1)$ where $n$ equals the number of operand bits to be added.

In the event that a relatively large number of operand bits are to be added, the number of cores required may be reduced, relatively speaking, with respect to an expansion of the arrangement described above in Table 2, by employing a modified type of two-step adding circuit which is wired in accordance with the Boolean statement set forth in Table 3.

TABLE 3

*Step 1*

$$DA0=B0$$
$$DA2=B2$$
$$DA4=B4$$
$$DA1=\overline{B1}\,B0\,A0+B1\,\overline{B0}+B1\,B0\,\overline{A0}$$
$$DA3=\overline{B3}\,B2\,A2+B3\,\overline{B2}+B3\,B2\,\overline{A2}$$
$$DA5=\overline{B5}\,B4\,A4+B5\,\overline{B4}+B5\,B4\,\overline{A4}$$
$$DC0=A1\,B1+\overline{A1}\,B1\,A0\,B0+A1\,\overline{B1}\,A0\,B0$$
$$DC1=A3\,B3+\overline{A3}\,B3A2\,B2+A3\,\overline{B3}\,A2\,B2$$

*Step 2*

$$DA2=C0$$
$$DA3=A2\,C0$$
$$DA4=C1+A3\,A2\,C0$$
$$DA5=A4\,C1+A4\,A3\,A2\,C0$$

In the foregoing table, the additional terms C0 and C1 are used to represent a facility for storing a carry. In all other respects, the circuitry is basically similar to that illustrated in FIGURE 2 with the exception of the number of cores involved and the particular connections of the cores and the output windings of the register circuits. In this particular embodiment of the invention, the number of cores may be represented by the following equation:

Total number of cores equals $$n\left(\frac{n+12}{4}\right)-3$$

While the foregoing apparatus has been described in terms of adding operations, it will be readily apparent that the principles hereof are equally applicable to subtracting operations. Thus, in order to subtract a pair of operands in the circuitry of FIGURE 1, it is necessary to first complement the operand to be subtracted from the other operand prior to its insertion into the operand register of the input circuit.

It will also be apparent to those skilled in the art that the principles of the invention may be applied to other similar types of mathematical operations which have their base in adding or subtracting.

While, in accordance with the provisions of the statutes, there has been illustrated and described the best forms of the invention known, it will be apparent to those skilled in the art that changes may be made in the apparatus described without departing from the spirit of the invention as set forth in the appended claims and that, in some cases, certain features of the invention may be used to advantage without a corresponding use of other features.

Having now described the invention, what is claimed as new and novel and for which it is desired to secure by Letters Patent is:

1. A binary adder comprising a plurality of saturable magnet cores, a first operand register comprising a plurality of pairs of current drivers each pair of which is adapted to operate in a binary mode indicative of each bit of a first operand, a first plurality of saturating windings selectively coupled to said plurality of cores and connected one each to said current drivers, a second operand register comprising a plurality of pairs of current drivers each pair of which is adapted to operate in a binary mode indicative of each bit of a second operand, a second plurality of saturating windings selectively coupled to said plurality of cores and connected one each to said current drivers of said second register, a complementing input connected to each pair of current drivers of said second operand register, a sense winding coupled to each complementing input, said sense winding being selectively coupled to predetermined ones of said magnetic cores, and driving means coupled to said magnetic cores to switch any core that is not saturated to produce a signal in any sense winding coupled thereto.

2. An adder comprising first and second operand registers, each register comprising a plurality of bistable pairs of signal supply circuits for defining the bits of each operand, complementing input means connected to the inputs of said second operand register, a plurality of saturable magnetic cores, means selectively coupling the outputs of said pairs of signal supply circuits in current saturating relationship to selected ones of said magnetic cores, a plurality of sense windings selectively coupled to said cores and to said complementing input means, a core switching driver means coupled to said plurality of cores to switch any core that is not saturated, an adder step controller coupled to said cores to saturate a first series of said plurality of cores so that a second series of cores will be free to switch if not saturated to effect a first step in an adding operation, and means activating said step controller to saturate said second series of cores and release said first series of cores for switching if not otherwise saturated by said signal supply circuits.

3. An accumulator comprising an operand input register having a plurality of bistable pairs of outputs each pair of which is adapted to be selectively activated to define a one or a zero, an accumulating register having a plurality of bistable pairs of outputs each pair of which is adapted to be selectively activated to define an accumulated one or a zero, a plurality of saturable magnetic cores, means selectively coupling said pairs of outputs of each of said registers to said cores to saturate selected ones of said cores in accordance with the data in said input and accumulating registers, a plurality of sense windings selectively coupled to said cores, complementing means connected to said accumulating register to complement the bistable operation of selected pairs of outputs thereof, means connecting said sense windings to said complementing means, and means coupled to said cores to switch any core that is not saturated.

4. An adder comprising first and second operand registers, each register comprising a plurality of bistable flip-flops each being adapted to control a pair of signal supply circuits for defining the bits of each operand, complementing input means connected to the inputs of said bistable flip-flops of said second operand register, a plurality of saturable magnetic cores, means selectively coupling the outputs of said pairs of signal supply circuits in current saturating relationship to selected ones of said magnetic cores, a plurality of sense windings selectively coupled to said cores and to said complementing input means, a core switching driver means coupled to said plurality of cores to switch any core that is not saturated, an adder step controller coupled to said cores to saturate a first series of said plurality of cores so that a second series of cores will be free to switch if not otherwise saturated to effect a first step in an adding operation, and means activating said step controller to saturate said second series of cores and release said first series of cores for switching if not otherwise saturated by said signal supply circuits.

5. An accumulator comprising an operand input register having a plurality of bistable pairs of outputs each pair of which is adapted to be selectively activated to define a binary one or a binary zero, an accumulating register having a plurality of bistable pairs of outputs each pair of which is adapted to be selectively activated to define an accumulated binary one or a binary zero, a plurality of saturable magnetic cores, means selectively coupling said pairs of outputs of each of said registers to said cores to saturate selected ones of said cores in accordance with the data in said input and accumulating registers, a plurality of sense windings selectively coupled to said cores, complementing means connected to said accumulating register to complement the bistable activation of selected pairs of outputs thereof, means connecting said sense windings to said complementing means, means coupled to said cores to switch any core that is not saturated, and step control means coupled to said cores to saturate in time sequence predetermined ones of said cores to divide the operation of said accumulator into steps.

6. An arithmetic apparatus comprising an operand input register having a plurality of bistable pairs of outputs each pair of which is adapted to be selectively activated to define a one or a zero, a second register having a plurality of bistable pairs of outputs each pair of which is adapted to be selectively activated to define the result of an arithmetic operation in terms of a binary one or a zero, a plurality of saturable magnetic cores, means selectively coupling said pairs of outputs of each of said register to said cores to saturate selected ones of said cores in accordance with the data in said input and second registers, a plurality of sense windings selectively coupled to said cores, complementing means connected to said second register to complement the bistable activation of selected pairs of outputs thereof, means connecting said sense windings to said complementing means, and means coupled to said cores to switch any core that is not saturated.

7. A binary adder comprising a plurality of saturable magnetic cores, first and second operand registers each comprising a plurality of pairs of current drivers each pair of which is adapted to operate in a binary mode indicative of each bit of a pair of input operands, a plurality of saturating windings selectively coupled to said plurality of cores and connected one each to said current drivers, a complementing input means connected to each pair of current drivers of one of said operand registers, a sense winding coupled to each complementing input, said sense winding being selectively coupled to predetermined ones of said magnetic cores, and driving means coupled to said magnetic cores to switch any core that is not saturated.

8. An arithmetic circuit comprising first and second operand registers, each register comprising a plurality of bistable pairs of signal supply circuits for defining the bits of each operand, complementing input means connected to the inputs of said second operand register, a plurality of saturable magnetic cores, means selectively coupling the outputs of said pairs of signal supply circuits in current saturating relationship to selected ones of said magnetic cores, a plurality of sense windings selectively coupled to said cores and to said complementing input means, a core switching driver means coupled to said plurality of cores to switch any core that is not saturated, and an arithmetic step controller coupled to said cores to saturate in timed sequence selected ones of said plurality of cores so that those cores not so saturated will be free to switch to effect a division of an arithmetic operation into a series of steps.

References Cited by the Examiner

UNITED STATES PATENTS

| | | | |
|---|---|---|---|
| 2,719,670 | 10/55 | Jacobs | 235—175 |
| 2,819,018 | 1/58 | Yetter | 235—176 |
| 2,819,019 | 1/58 | Yetter | 235—176 |
| 2,962,215 | 11/60 | Haynes | 235—175 |

ROBERT C. BAILEY, *Primary Examiner.*

MALCOLM A. MORRISON, *Examiner.*